United States Patent
Yenerim

(10) Patent No.: US 6,690,916 B1
(45) Date of Patent: Feb. 10, 2004

(54) RADIO NETWORK FOR RADIO COMMUNICATION IN AN ENCLOSED ENVIRONMENT AND A REPEATER FOR SUCH A RADIO NETWORK

(75) Inventor: Savas Yenerim, Berlin (DE)

(73) Assignee: Motorola, Inc., Schaumburg, IL (US)

( * ) Notice: Subject to any disclaimer, the term of this patent is extended or adjusted under 35 U.S.C. 154(b) by 555 days.

(21) Appl. No.: 09/684,137

(22) Filed: Oct. 10, 2000

(51) Int. Cl.[7] ............................. H04B 7/15; H04B 7/14
(52) U.S. Cl. .................... 455/11.1; 455/14; 455/15; 455/445; 455/500; 455/424; 370/315
(58) Field of Search ....................... 455/7, 9, 11.1, 455/14, 15, 16, 445, 403, 422.1, 423, 424, 426.2, 500, 501, 63.1; 370/310, 315, 316

(56) References Cited

U.S. PATENT DOCUMENTS

| | | | |
|---|---|---|---|
| 4,039,947 A | * | 8/1977 | Miedema ........................ 455/8 |
| 4,733,391 A | * | 3/1988 | Godbold et al. ............. 370/254 |
| 4,949,340 A | * | 8/1990 | Smith et al. ................. 370/226 |
| 5,252,961 A | * | 10/1993 | Yamauchi .................... 370/243 |
| 5,461,497 A | * | 10/1995 | Mackichan .................. 398/181 |
| 5,551,056 A | * | 8/1996 | Koponen et al. .............. 455/8 |
| 5,898,837 A | * | 4/1999 | Guttman et al. ............. 709/224 |
| 6,453,432 B1 | * | 9/2002 | Pesetski et al. .............. 714/713 |
| 2002/0137458 A1 | * | 9/2002 | Talwalkar et al. ............ 455/15 |
| 2003/0045240 A1 | * | 3/2003 | Bogardus et al. ........... 455/67.1 |

FOREIGN PATENT DOCUMENTS

EP          0 935 356 A2    *  11/1999   ........... H04B/10/08

* cited by examiner

Primary Examiner—Nay Maung
Assistant Examiner—Edan Orgad
(74) Attorney, Agent, or Firm—Steven R. Santema; Valerie M. Davis

(57) ABSTRACT

The invention discloses a radio network for radio communication in an enclosed environment such as a tunnel or an in-house environment including a first head end station (1) and cascaded bi-directional repeaters (4, 5, 10) connected via a radiation cable (3). In case of a break of the radiation cable, a second redundant head end station (2) is connected to the radiating cable via switch (30) and to the first head end station via a second connection (11) and the repeaters behind a disconnection point of the radiating cable (3) interchange their downlink and uplink transmission directions, such that the radio communication is possible in front and behind the disconnection point. Furthermore, the repeaters are adapted to detect a malfunction of themselves and to bypass themselves in reaction to the detection of a malfunction.

11 Claims, 2 Drawing Sheets

RADIO NETWORK FOR RADIO COMMUNICATION IN AN ENCLOSED ENVIRONMENT AND A REPEATER FOR SUCH A RADIO NETWORK

FIELD OF THE INVENTION

The present invention generally relates to a radio network for radio communication in an enclosed environment and to a repeater for such a radio network.

BACKGROUND OF THE INVENTION

It is generally known to provide a radio network for radio communication in an enclosed environment such as a tunnel or an in-house environment. Such a radio network usually includes a base station connected to a head end station. The head end station is connected to a radiation cable extending along the area, region, or the like to be provided with radio communication such as a tunnel, floors, stairs or the like in a house and so on. The radiating cable is provided with cascaded bi-directional repeaters transmitting the radio signals in both directions.

In case of a failure of one of the repeaters or in case of a breakdown of the radiating cable, for example because of a break caused by an accident in a tunnel, the function behind the position of the defect cannot be ensured, because of the failure of the repeater or the disconnection of the radiating cable.

Therefore, according to the prior art, a second radiating cable and repeater installation is necessary in order to provide a redundant system. The provision of such a redundant second radiation cable and repeater installation results in considerably increased installation and material costs for the complete radio network.

The present invention seeks to provide a radio network for radio communication in an enclosed environment and a repeater for such a radio network which mitigate or avoid these and other disadvantages and limitations of the prior art.

DETAILED DESCRIPTION OF THE PREFERRED EMBODIMENT

Figure 1:
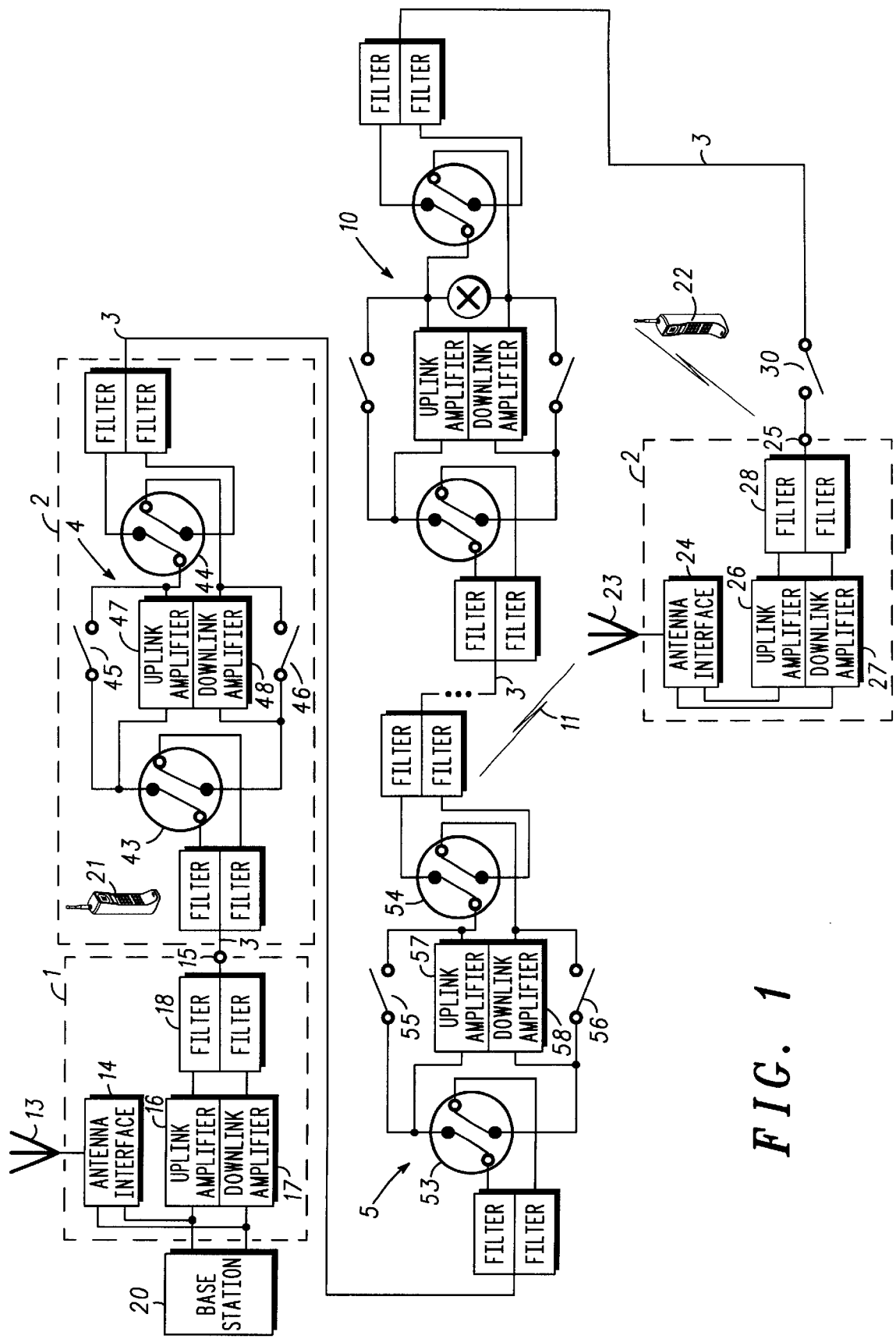
FIG. 1 illustrates a radio network according to an embodiment of the invention.

A preferred embodiment of a radio network according to the invention is described referring to FIG. 1. The radio network for radio communication in an enclosed environment such as a tunnel, a house, a subway or the like, comprises a first head end station 1, a second head end station 2, a radiating cable 3 providing a first connection between the first head end station and the second head end station 2, a plurality of cascaded bi-directional repeaters 4, 5, 10 (three of which are shown as an example in FIG. 1, the number of which is, however, not restricted to three but could be any positive integer $\leq 1$), and a second connection 11 between the first head end station 1 and the second head end station 2. In the present embodiment, the first head end station 1 is connected to a base station 20 of a communication system like a cellular telephone system.

The first head end station 1 comprises an antenna 13, an antenna interface 14, an input/output 15, an amplifier for downlink communication (downlink amplifier) 16, an amplifier for uplink communication (uplink amplifier) 17 and a set of filters 18. The downlink amplifier 16 and the uplink amplifier 17 are connected to the input/output 15 via the set of filters 18, and the radiating cable 3 is connected to the input/output 15 from the outside. The configuration of the second head end station 2 is the same as described for the first head end station 1, wherein the corresponding elements are indicated with reference numerals including "2" instead of "1"; these elements are head end station 2, antenna 23, antenna interface 24, input/output 25, downlink amplifier 26, uplink amplifier 27, set of filters 28.

Input/output 25 is connected to the radiating cable 3 via a switch 30 to be explained later.

The plurality of cascaded bi-directional repeaters 4, 5, 10 is connected into the radiating cable 3, as shown in FIG. 1. Each of the repeaters 4, 5, 10 is configured such that it is able to detect a disconnection (cut-off or the like) of the radiating cable 3 and to change the direction of the uplink transmission and the downlink transmission in reaction to the detected cut-off using cross-switches 43 and 44, or 53 and 54, or the corresponding cross-switches not explicitly indicated with reference numerals in FIG. 1, as it is described later.

Furthermore, each of the repeaters 4, 5, 10 is configured such that it is able to detect a malfunction of itself or a part of itself and to bypass signals on the radiating cable 3 in reaction to the detected malfunction using bypass switches 45 and 46, or 55 and 56, or the corresponding bypass switches not explicitly indicated with reference numerals in FIG. 1, as it is described later.

Briefly summarizing, the radio network for radio communication in an enclosed environment according to the preferred embodiment shown in FIG. 1 comprises the first head end station 1 and a plurality of cascaded bi-directional repeaters 4, 5, 10 connected to each other via radiating cable 3 and additionally the second head end station 2 connectable to the radiating cable 3 via switch 30 and connectable to the first head end station 1 via the second connection 11, which could be a wireless radio connection, or a wired or optical fiber connection such as a connection via a public switched telephone network or a specific communication line or the like.

Now, a use of this radio network for radio communication in an enclosed environment for a cellular telephone system using a base station and mobile telephones is described. The base station is connected to the first head end station 1. The mobile telephones, two of which are shown in FIG. 1 and indicated with reference numerals 21, 22, can receive and transmit signals from and to radiating cable 3.

The radio network is configured such that radio signals are radiated and received from the same cable, namely radiating cable 3. The radiating cable 3 is segmented into segment paths. At the end of each segment path, one of the repeaters 4, 5, 10 is arranged in order to amplify again the signals for the uplink and downlink transmissions attenuated while propagating along the corresponding segment of radiating cable 3.

In a usual operation, the radio network is connected to the first head end station 1 only and the switch 30 is switched off, such that the second head end station 2 is disconnected from the radiating cable 3.

The first head end station 1 transmits a pilot signal for the downlink communication (downlink=communication from the base station towards the mobile unit) via radiating cable 3 to the repeaters 4, 5, 10 and the mobile units 21, 22. The pilot signal for downlink is used for controlling the downlink amplifiers included in the repeaters 4, 5, 10.

The downlink pilot signal is set to another frequency at the end of the radio communication path and is transmitted as a second pilot signal back toward the first head end station 1 via the uplink communication path, i.e. is transmitted as an uplink pilot signal. This second pilot signal is used for controlling the uplink amplifiers in repeaters 4, 5 and 10.

As described above, each of repeaters 4, 5, 10 is configured such that it can detect a malfunction of itself or a part of itself. This detection is explained later with respect to an embodiment of the repeater. In response to the detection of a malfunction, the repeater controls the bypass switches such that the downlink and/or uplink signals are bypassed. Therefore, the repeater having the malfunction does not affect the downlink and/or uplink signals any more. Therefore, the signals are bypassed around the defect repeater or the defect part of the defect repeater. The signals are attenuated corresponding to the length of the cable. However, the distance of the repeaters is configured such that a sufficient signal intensity is maintained, if one repeater has to be bypassed.

The repeater adjacent to the bypassed repeater evaluates the uplink and downlink signals using the pilot signals and recognizes the same as week signals and adapts the amplification such that the usual signal strength is recovered.

The repeaters are additionally configured such that they are able to detect a disconnection of the radiating cable, as mentioned above. In case of such a disconnection, the downlink pilot signal is not present any more behind the disconnection, i.e. at the repeaters opposite to the disconnection point with respect to the first head end station 1. The corresponding repeaters not receiving the downlink pilot signal any more detect the corresponding state and control the cross-switches 43, 44, or 53, 54, or the like such that the directions of the uplink and downlink transmissions are changed. Furthermore, switch 30 (for example controlled by repeater 10 closest to the second head end station 2 or by a DC current fed into the radiating cable in the second head end station) is closed such that the second head end station 2 is connected to the repeaters behind the disconnection point via radiating cable 3. Furthermore, the downlink signal transmitted from first head end station 1 to radiating cable 3 is, for example,m on request from the second head end station 2 via the second connection 11, additionally transmitted to the second head end station 2 via the second connection 11. The second head end station 2 transmits the downlink signal via radiating cable 3 to the repeaters behind the disconnection point (if seen from first head end station 1). The uplink signals received in the portion of radiating cable 3 disconnected by the first head end station 1 are transmitted to the first head end station 1 from the second head end station 2 via the second connection 11, such that the radio communication is possible in all portions of the radio network.

The advantage of the solution shown in FIG. 1 is obvious, because no second radio network is necessary in order to provide a redundancy in case of a malfunction of one repeater and/or in case of a disconnection of the radiating cable 3. The costs for the second head end station 2, i.e. the redundant head end station, and the second connection 11 are much lower than a complete second network. Furthermore, the costs for the redundant head end station and the second connection can be further reduced, if a reduced number of channels is available in comparison to the normal operation.

Figure 2:
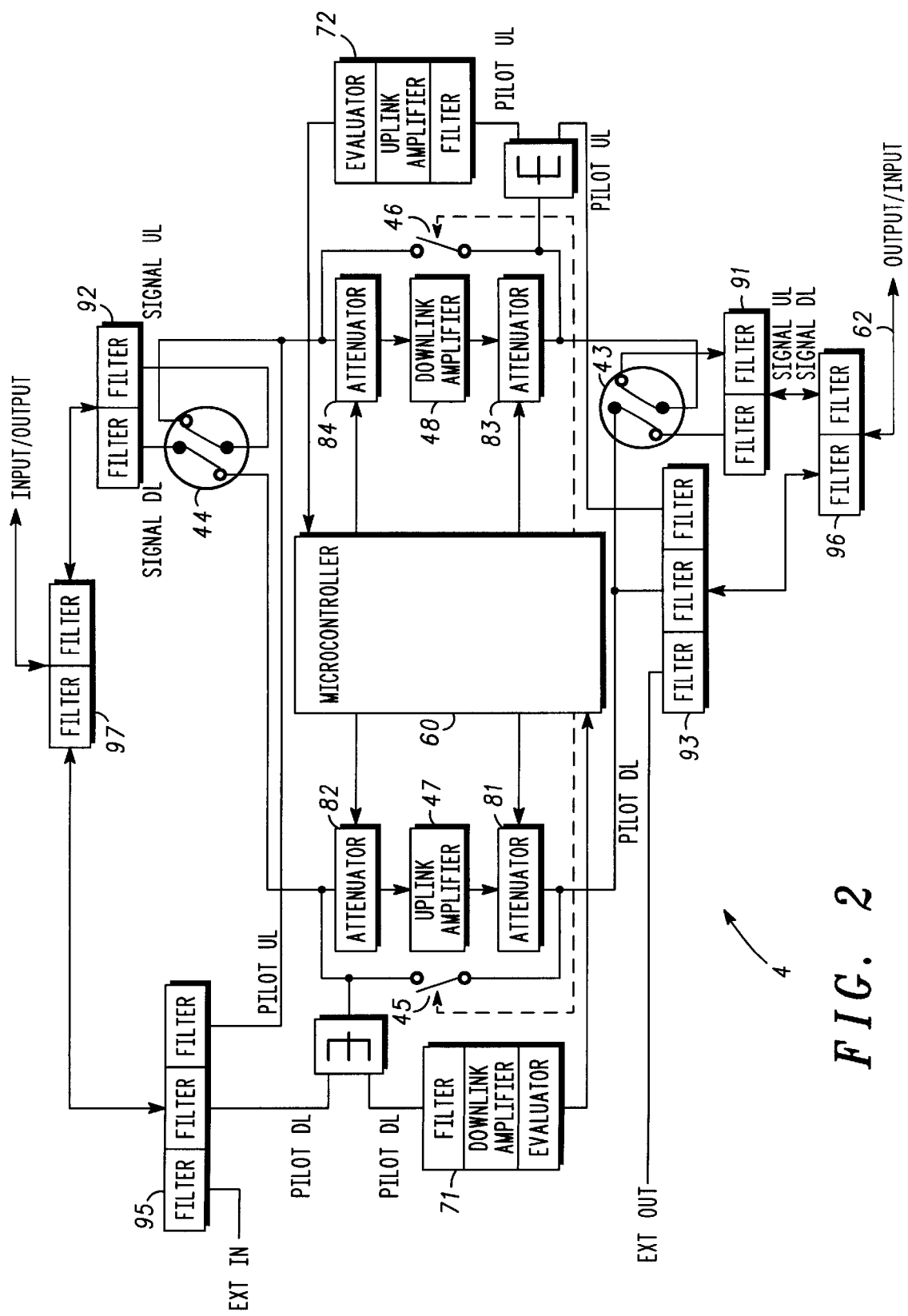
FIG. 2 illustrates a repeater according to an embodiment of the present invention.

In the following, a description is given of a bi-directional repeater for use in the above-described radio network referring to FIG. 2. FIG. 2 shows the repeater 4 of FIG. 1 as an example. The configuration of each of repeaters 4, 5, 10 is identical.

Repeater 4 is connected to radiating cable 3 at input/outputs 41 and 42, resp. The amplification of the repeater is controlled using the downlink and uplink pilot signals. In order to control the amplification of the downlink amplifier, the amplitude of the downlink pilot signal is evaluated using evaluating circuit 71, as conventionally known in the art. As already described above, the downlink pilot signal is set to another frequency at the end of the radio path and transmitted in direction of the first head end station via the uplink communication path as an uplink pilot signal, as conventionally known in the art. In order to control the uplink amplifier 48, the uplink pilot signal is evaluated in evaluating circuit 72, as conventionally known in the art.

The current consumption of the amplifiers of the active stage is monitored by a corresponding circuit. If such an amplifier has a malfunction, the operating current of the amplifier changes such that a malfunction of the amplifier can be detected. If such a malfunction is detected, a control signal for the corresponding bypass switch 45 and/or 46 is generated such that the amplifier having the malfunction is bypassed.

In the repeater following the bypassed amplifier, the bypassed signals are recognized as week signals using the pilot signals and the amplification of the corresponding amplifier is controlled by means of digital attenuation elements 81, 82, 83, 84 such that a normal signal strength is recovered.

The repeater according to the embodiment shown in FIG. 2 includes additionally a number of filters 91–97 enabling to separate downlink and uplink signals ("SIGNAL DL", "SIGNAL UL") from the pilot signals for the downlink and uplink direction ("PILOT DL" and "PILOT UL"). Furthermore, the corresponding filters 93, 95, 96 and 97 enable to transmit additional radio signals or to connect additional uni-directional repeaters to the external terminals Ext(in) and Ext(out).

As already described in connection with the radio network, the downlink pilot signal is not present any more behind the disconnection point (seen from the first head end station 1). The pilot signal evaluation circuit 71 and a microcontroller 60 (the microcontroller 60 and the pilot signal evaluation circuits 71, 72 forming a control means) detect this state, i.e. the missing of the downlink pilot signal. This state is detected by all repeaters behind the disconnection point. The repeater 4, i.e. the microcontroller 60 of the control means, controls the cross-switches 43 and 44 in reaction to the detection such that the input and the output of the downlink amplifier are switched to the uplink duplexers, which in normal operation transmit the uplink frequencies only. On the other hand, the input and the output of the uplink amplifier are switched to the downlink duplexers, which in normal operation transmit the downlink frequencies.

This switching of the cross-switches results in that directions for the uplink and downlink transmissions are interchanged. This results in that a signal transmitted from a mobile unit (21, 22 in FIG. 1) behind the disconnection point and received by the radiating cable 3 behind the disconnection point can be transmitted to the second head end station 2, which is connected to the radiating cable 3 via switch 30.

The repeater 4 includes non-expensive highly linear HF broad band amplifiers and includes additionally HF switches or HF relays, the additional costs of which are low.

Therefore, the repeater according to the embodiment of the invention does not result in a significant increase of costs in comparison to a conventional repeater, but provides for the implementation of the radio network described with respect to FIG. 1.

While the invention has been described in terms of particular structures, devices and methods, those of skill in the art will understand based on the description herein that it is not limited merely to such examples and that the full scope of the invention is properly determined by the claims that follow.

What is claimed is:

1. A radio network for radio communication in an enclosed environment, comprising:
    a first head end station,
    a second head end station,
    a radiating cable providing a first connection between the first and second head end stations, and
    at least two repeaters cascaded in the radiating cable, wherein each repeater is adapted to detect a disconnection of the radiating cable and to change the directions of uplink and downlink transmissions in reaction to the detected disconnection.

2. The network according to claim 1, wherein the first and the second head end stations are connected to each other via a second connection.

3. A radio network for radio communication in an enclosed environment, comprising:
    a first head end station,
    a second head end station,
    a radiating cable providing a first connection between the first and second head end stations, and at least two repeaters cascaded in the radiating cable, wherein each repeater is adapted to detect a disconnection of the radiating cable and to change the directions of uplink and downlink transmissions in reaction to the detected disconnection, and wherein each repeater is adapted to detect a malfunction of itself and bypass signals on the radiating cable in reaction to the detected malfunction.

4. The network according to claim 3, wherein the first and the second head end stations are connected to each other via a second connection.

5. A repeater for a radio network for radio communication in an enclosed environment, comprising:
    a first input/output,
    a second input/output,
    first amplifying means for amplifying a signal on a first amplification path,
    second amplification means for amplifying a signal on a second amplification path,
    switching means for selectively connecting the first and second input/outputs and the first and second amplification paths such that the first input/output is the input for one of the two amplification paths and the output for the other one of the two amplification paths and the second input/output is the input for the other one of the two amplification paths and the output for the one of the two amplification paths, and
    control means for controlling the operation of the repeater, wherein the control means is adapted for detecting the loss of a pilot signal at the first or second input/outputs and for controlling the switching means such that the functions of each of the input/outputs as input or output of the two amplification paths are interchanged.

6. A repeater for a radio network for radio communication in an enclosed environment, comprising:
    a first input/output,
    a second input/output,
    first amplifying means for amplifying a signal on a first amplification path,
    second amplifying means for amplifying a signal on a second amplification path,
    switching means for selectively bypassing the first and/or second amplifying means, and
    a control means for controlling the operation of the repeater, wherein the control means is adapted for detecting a malfunction of the first and/or second amplifying means and for controlling the switching means such that the amplifying means detected to have a malfunction is bypassed.

7. A repeater for a radio network for radio communication in an enclosed environment, comprising:
    a first input/output,
    a second input/output,
    first amplifying means for amplifying a signal on a first amplification path,
    second amplifying means for amplifying a signal on a second amplification path,
    first switching means for selectively connecting the first and second input/outputs and the first and second amplification paths such that the first input/output is the input for one of the two amplification paths and the output for the other one of the two amplification paths and the second input/output is the input for the other one of the two amplification paths and the output for the one of the two amplification paths,
    second switching means for selectively bypassing the first and/or second amplifying means, and
    a control means for controlling the operation of the repeater, wherein the control means is adapted for detecting the loss of a pilot signal at the first or second input/outputs and for controlling the first switching means such that the functions of each of the input/outputs as input or output of the two amplification paths are interchanged, and wherein the control means is adapted for detecting a malfunction of the first and/or second amplifying means and for controlling the second switching means such that the amplifying means detected to have a malfunction is bypassed.

8. The repeater according to claim 7, wherein the first switching means comprises two cross-switches for interchanging the inputs and outputs of the first and second amplifying means.

9. The repeater according to claim 8, wherein the second switching means comprises a bypass relay for bypassing the first and/or second amplifying means.

10. The repeater according to claim 7, wherein the first switching means comprises two cross-switches for interchanging the inputs and outputs of the first and second amplifying means.

11. The repeater according to claim 10, wherein the second switching means comprises a bypass relay for bypassing the first and/or second amplifying means.

* * * * *